(12) United States Patent
McKibben et al.

(10) Patent No.: US 7,376,225 B2
(45) Date of Patent: May 20, 2008

(54) METHOD FOR FEATURE TRANSFER IN A TELECOMMUNICATION NETWORK

(75) Inventors: Bernerd R. McKibben, Gilbert, AZ (US); Pramodkumar Patel, Phoenix, AZ (US); Derek A. Oxley, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 1689 days.

(21) Appl. No.: 09/917,074

(22) Filed: Jul. 27, 2001

(65) Prior Publication Data

US 2003/0023523 A1    Jan. 30, 2003

(51) Int. Cl.
*H04M 3/42* (2006.01)

(52) U.S. Cl. ............................. 379/201.01; 379/201.02; 379/201.12; 379/207.02; 379/212.01; 379/213.01; 455/414.01

(58) Field of Classification Search ........... 379/201.01, 379/211.01, 211.02, 212.01, 201.02, 201.12, 379/207.02, 213.01, 215.01; 455/414.01
See application file for complete search history.

(56) References Cited

U.S. PATENT DOCUMENTS

| | | | | |
|---|---|---|---|---|
| 4,899,373 A | * | 2/1990 | Lee et al. ............... | 379/201.05 |
| 5,432,845 A | * | 7/1995 | Burd et al. ............. | 379/211.01 |
| 5,544,236 A | * | 8/1996 | Andruska et al. ....... | 379/201.02 |
| 5,590,187 A | * | 12/1996 | Greenspan ............. | 379/212.01 |
| 5,796,812 A | * | 8/1998 | Hanlon et al. .......... | 379/212.01 |
| 5,845,207 A | * | 12/1998 | Amin et al. ............. | 455/414.1 |
| 5,937,051 A | * | 8/1999 | Hurd et al. ............. | 379/212.01 |
| 6,038,293 A | * | 3/2000 | McNerney et al. ...... | 379/88.19 |
| 6,173,048 B1 | * | 1/2001 | Malik .................... | 379/207.11 |
| 6,173,049 B1 | * | 1/2001 | Malik .................... | 379/207.11 |
| 6,215,865 B1 | * | 4/2001 | McCalmont ............ | 379/212.01 |

\* cited by examiner

*Primary Examiner*—Harry S. Hong
(74) *Attorney, Agent, or Firm*—Frank J. Bogacz; Kevin D. Wills; Simon B. Anolick

(57) ABSTRACT

A network (30) of a telecommunication system (100) receives requests (31) for feature transfers from one user (10) to another user (20). In addition, network initiated feature transfer marks a call agent (61) for feature transfer. Subsequent call attempts from a call agent (51) are redirected (63) by the network.

16 Claims, 1 Drawing Sheet

100

METHOD FOR FEATURE TRANSFER IN A TELECOMMUNICATION NETWORK

BACKGROUND OF THE INVENTION

The present invention pertains to telecommunication services and more particularly to subscriber and network initiated feature transfers in a telecommunication system.

Telecommunication networks provide a vast array of features. For example, subscribers may have call waiting, call forwarding, link security and closed user group accesses among the many features available. Various network users will have different user profiles that are lists of these features which the users are entitled to use. Existing networks do not provide the ability for a user to request features to be authorized for another user. These networks allow users to request features on a temporary basis only for themselves. Existing networks do not allow a set of users from various networks to harmonize the set of features for conducting a communication session or for a particular time period.

Further, another network feature provided is interception of calls. A call interception is made by activating intercept functions on a targeted call session agent (originating or terminating party), and redirecting control and bearer information to a law enforcement agency. Typically, once the redirected call ends, interception activation of the originating call agent is removed. Networks are required by law to provide call interception on all calls forwarded by a targeted party. Existing networks perform the call forwarding in a proxy-like fashion. That is, the forwarding call agent remains in the redirected call even though the targeted forward party is not on the call. The use of redirect in today's multimedia 3G market prevents call intercept by the existing intercept method.

Accordingly, it would be highly desirable to provide a telecommunication network in which user initiated and network initiated feature transfer or feature purchase for other users may be made. In addition, it is highly desirable to provide a call intercept arrangement that may intercept forwarded calls via a redirect mechanism.

DESCRIPTION OF THE PREFERRED EMBODIMENT

Figure 1:
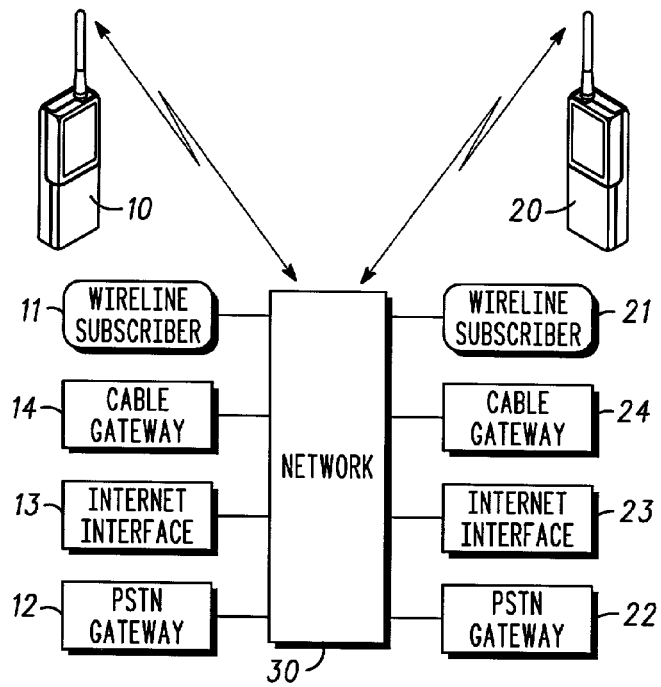
FIG. 1 is a block diagram of a telecommunication system including a network in accordance with the present invention.

FIG. 1 is a block diagram of a telecommunication system 100 including network 30. Wireless subscribers 10 and 20 are coupled to network 30 as are wireline subscribers 11 and 21. Cable gateways 14 and 24 are also coupled to network 30. These cable gateways may supply mixed video and voice telecommunications to subscribers. PSTN gateways 12 and 22 connect conventional wireline subscribers to network 30 via other telecommunication networks (not shown). In addition, internet interfaces 13 and 23 connect wireless or wireline users of the internet for voice over internet protocol (VOIP) arrangements.

An example of the user initiated feature transfer follows. For the following example, it is assumed that there is a closed user group (CUG) comprising users 10, 11, 20 and 21. It is further assumed that the users are in a video and audio conference and a security feature, such as cryptography, is required for viewing the communicated information. Further, it is assumed that user 20 does not have the security feature. As a result of user 20 not having a secure feature, the secure teleconference cannot go forward.

In this example, user 11 determines that his profile should be transferred to user 20. User 11 profile does include the security feature. User 11 will drive or initiate network 30 to provide the appropriate profile to user 20 secure communication for a predetermined or specified period of time.

As an alternative, user 11 may determine that instead of transferring user 11's profile to user 20, that user 11 will pay for or buy the security service for user 20 only for the present communication session. In this case, the network 30 must be instructed to track this and to generate a bill not for user 20 but for user 11.

For the intercept scenario in an internet situation in which Voice Over Internet Protocol (VOIP) is used, the following example will be considered. For Voice Over Internet Protocol in 3G or 3GPP networks, using the Session Initiation Protocol (SIP), the originating call agent drops out of a forwarded call. A call agent (not shown) associated with internet interface would drop out of the call that was forwarded to network 30 in the case of Voice Over Internet Protocol on the internet. The above mentioned call agent may or may not be a part of network 30. Network 30 will intercept a forwarded call by a call agent (not shown) via the redirect mechanism. The call intercept activation is transferred from one call agent to a proxy call agent associated with internet interface 13 exclusively for intercepting a redirected call.

Figure 2:
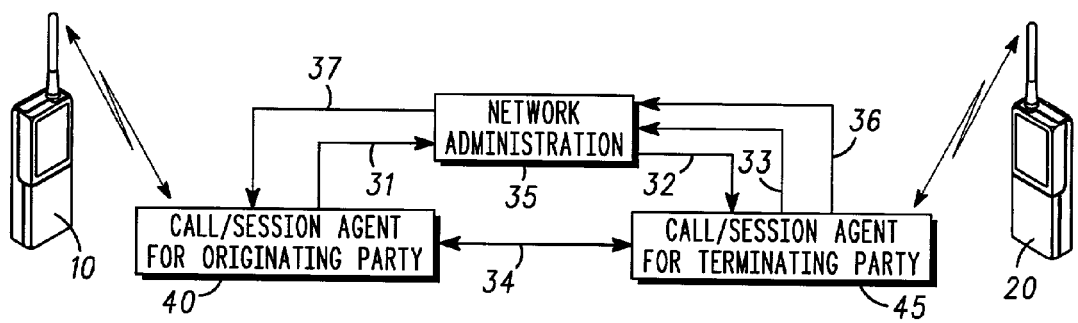
FIG. 2 is a flow diagram of a user initiated feature transfer in accordance with the present invention.

FIG. 2 is a flow diagram of a user initiated feature transfer. Network administration 35 is included in network 30. Originating call session agent 40 and terminating call session agent 45 are associated with the originating and terminating parties such as users 10, 11, 20 and 21 or users coupled through cable gateways 14 and 24, users coupled through the internet interfaces 13 and 23 or users coupled through the PSTN (Public Switch Telephone Network) gateways 12 and 22.

A mobile or wireline user associated with call session agent 40 first makes a request 31 to the network administration 35 for transferring or replicating the user's 10 profile to the user 20 associated with agent 45 or for purchasing for user 20, which is associated with call session agent 45, a particular feature. This may be, for example, purchasing a security feature as mentioned above. As a result of call session agent 40's request 31, network administration 35 activates 32 the requested feature for user 20 via the call session agent 45.

If user 20 accepts the security activation, call agent 45 transmits a message of acceptance 33 back to network administration 35. The session or call 34 is then established with the selected feature transfer, security for example, between users 10 and 20 via their respective call session agents 40 and 45.

When the session or call 34 is terminated, call session agent 45 generates a use billing report 36 which is transmitted to network administration 35. Lastly, network administration 35 sends a feature use report 37 including appropriate billing information back to the call session agent 40 for user 10.

As a result, user 10 is billed for user 20's use of the security feature during their call 34. The above described feature transfer was initiated by user 10, for example, with user 10 paying for the feature used by user 20. As a result, a user who would otherwise be unable to participate in the session for lack of a security feature, has been given the security feature for a particular session and another has been billed for that use. A session limited feature transfer was affected to perform this session In an alternative embodiment, the feature transfer or replication could have been purchased by user 10 for user 20, or for a group of users, for a specific period of time.

Figure 3:
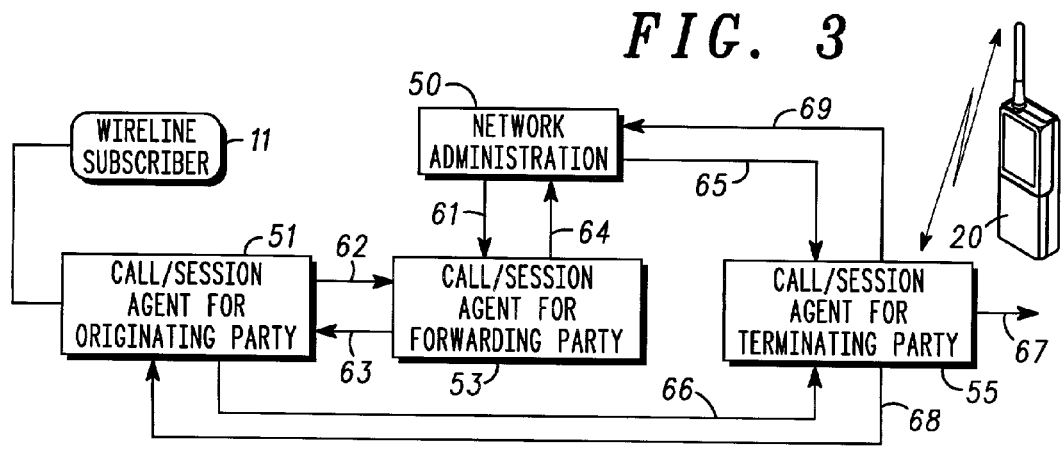
FIG. 3 is a flow diagram of a network initiated feature transfer in accordance with the present invention.

Referring now to FIG. 3, a block diagram of a network initiated feature transfer or call intercept is shown. Network administration 50 which also provides the intercept feature, for example, is included in network 30. Call or session agent 51 couples originating party 11 to the intercept administration 50. Similarly, call or session agent 55 couples terminating party 20 to intercept administration 50.

For a lawful intercept as directed by a law enforcement agency or the network owner, network intercept administration 50 is instructed and marks call or session agent 53 which is associated with user 11 for a call intercept. For 3G or 3GPP communication standards, the forwarding call agent 53 does not remain connected in the network so that network intercept administration 50 may directly intercept call agent 53 for the complete duration of the forwarded call or session.

User 11 makes a call attempt through call agent 51 to attempt 62 to reach target user 20. Since call session agent 53 has been marked for call intercept 61, call session agent 53 sends a call redirect message 63 including a user profile that indicates to call forward to the originating call agent 51.

Then call agent 53 sends a redirect report message 64 to network intercept administration 50. Since network intercept administration 50 has been notified of an interception by call agent 53, network intercept administration 50 transmits an intercept activation 65 to the target user 20 or call agent for terminating party 55 for intercepting the call or session. Next, call agent 51 makes the redirected call attempt 66 to the terminating call agent 55. Call agent 55 then intercepts the call intended for target user 20 and transmits the message with the results to law enforcement agency 67.

When the caller session terminates, a termination message 68 is sent from call agent 55 to the originating call agent 51. In addition, call agent 55 reports the caller session termination and intercept deactivation 69 via a message to network intercept administration 50. Intercept administration 50 then knows that the intercepted call or session has been accomplished. Also, call agent 51 may then release the originating user 11 from the call.

Alternatively, the network administration 50 could have transferred the intercept to originating call agent 51 instead of terminating call agent 55 at the discretion of the network administration 50. In addition, although the intercept portion of the call forwarding party's user profile was transferred in the above mentioned example, other portions of the user profile such as basic network services may be transferred under control of the network administration 50.

The above described invention provides the benefit of harmonizing features among a closed user group (CUG) and allows one user to pay for another user's feature use for a particular session or for a time interval. This invention allows users of 3GPP type networks to communicate using all the latest features developed by various network operators. Further, this invention allows call intercept by profile transferring from one call agent to another.

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. In a telecommunication network, a method for user initiated feature transfer, the method comprising the steps of:
   providing a first call agent including a first user;
   providing a second call agent including a second user;
   receiving by a network a request from a first user for a new feature provided by the network to be transferred from the network to a second user;
   activating by the network the new feature for the second user through the second call agent; and
   accepting by the second user through the second call agent the new feature.

2. In a telecommunication network, a method for user initiated feature transfer as claimed in claim 1, wherein there is further included the step of establishing a call between the first and second users with the new feature.

3. In a telecommunication network, a method for user initiated feature transfer as claimed in claim 1, wherein there is further included the step of generating by the second call agent a billing report.

4. In a telecommunication network, a method for user initiated feature transfer as claimed in claim 3, wherein there is further included the step of transmitting the billing report by the second call agent to the network.

5. In a telecommunication network, a method for user initiated feature transfer as claimed in claim 3, wherein there is further included the step of transmitting the billing report by the network to the first call agent.

6. In a telecommunication network, a method for user initiated feature transfer as claimed in claim 1, wherein the step of receiving by a network a request for a new feature includes the step of receiving by the network a request for transferring a user profile from the first user to the second user.

7. In a telecommunication network, a method for user initiated feature transfer as claimed in claim 1, wherein there is further included the step of requesting by the first user the new feature for the second user for a predetermined period of time.

8. In a telecommunication network, a method for user initiated feature transfer as claimed in claim 1, wherein there is further included the step of requesting by the first user the new feature for the second user for a particular communications session or call.

9. In a telecommunication network, a method for user initiated feature transfer as claimed in claim 1, wherein there is further included the step of replicating a plurality of features of the first user for use by the second user.

10. In a telecommunication network, a method for network initiated feature transfer, the method comprising the steps of:
    providing a first call agent including a first user;
    providing a second call agent including a second user;
    marking a third call agent for call intercept, wherein the call intercept is a feature provided by the telecommunications network for use by the first user and the second user;
    redirecting by the third call agent a call attempt from the first user to the second user by the call intercept feature; and
    activating by the telecommunication network a call intercept for the second call agent.

11. In a telecommunication network, a method for network initiated feature transfer as claimed in claim 10, wherein there is further included the step of rerouting by the second call agent the call attempt to an authorized agency.

12. In a telecommunication network, a method for network initiated feature transfer as claimed in claim 10, wherein there is further included the step of placing a call by the first call agent for the first user.

13. In a telecommunication network, a method for network initiated feature transfer as claimed in claim 10, wherein there is further included the step of transmitting a redirect message by the third call agent to the telecommunication network.

14. In a telecommunication network, a method for network initiated feature transfer as claimed in claim 10, wherein there is further included the step of establishing a call between the first call agent and the second call agent.

15. In a telecommunication network, a method for network initiated feature transfer as claimed in claim 14, wherein there is further included the step of terminating the call by transmitting a message from the second call agent to the first call agent.

16. In a telecommunication network, a method for network initiated feature transfer as claimed in claim 15, wherein there is further included the step of transmitting a session termination intercept report from the second call agent to the telecommunication network.

* * * * *